United States Patent [19]
Kelley

[11] 3,835,711
[45] Sept. 17, 1974

[54] DEVICE FOR MEASURING SPECIFIC GRAVITY OF LIQUIDS
[75] Inventor: William E. Kelley, Euclid, Ohio
[73] Assignee: Aquarium Systems, Inc., Eastlake, Ohio
[22] Filed: June 25, 1973
[21] Appl. No.: 372,947

[52] U.S. Cl. ................................................ 73/444
[51] Int. Cl. ........................................... G01n 9/12
[58] Field of Search ...................... 73/444, 448, 447

[56] References Cited
UNITED STATES PATENTS

| | | | |
|---|---|---|---|
| 1,381,929 | 6/1921 | Midgley | 73/440 |
| 1,412,884 | 4/1922 | Midgley | 73/440 |
| 2,631,183 | 3/1953 | Babis | 73/444 X |
| 3,186,423 | 6/1965 | Davidson et al. | 73/447 X |
| 3,631,727 | 1/1972 | White | 73/440 |
| R24,075 | 10/1955 | De Giers | 73/32 |

FOREIGN PATENTS OR APPLICATIONS 204,668  10/1967  U.S.S.R. ............................ 73/448

Primary Examiner—Richard C. Queisser
Assistant Examiner—Stephen A. Kreitman
Attorney, Agent, or Firm—Donnelly, Maky, Renner & Otto

[57] ABSTRACT

Device consists of an elongated body portion weighted on opposite ends thereof. The density of the body portion is preferably less than the desired density or density range of the liquid medium whose density is to be measured, whereas the density of the weighted ends of the device is greater so that the average density of the entire device falls within the desired density range of the liquid medium. Alternatively, the body portion may be more dense than the liquid medium to be measured and the ends unweighted by plugs of lower density than the liquid medium to be measured. The ends of the device are also slightly unbalanced whereby when the device is placed in a liquid medium of the desired density range, the device will become suspended within the liquid medium below the surface of a vertical position with the heavier end down and the lighter end up. If the density of the liquid medium increases or decreases, the device will so indicate by correspondingly rising or falling within the liquid medium. If the density of the liquid medium becomes quite low, the device will sink to the bottom with both ends resting on the bottom, whereas if the density of the liquid medium becomes quite high, the device will float to the top of the liquid medium with both ends floating on top of the water, thereby indicating at a glance the approximate density range of the liquid medium.

10 Claims, 3 Drawing Figures

DEVICE FOR MEASURING SPECIFIC GRAVITY OF LIQUIDS

BACKGROUND OF THE INVENTION

This invention relates generally as indicated to a device for measuring specific gravity of liquids, and particularly sea water.

There are, of course, a variety of devices which may be used to measure the specific gravity of various liquids, including sea water. However, many such devices are relatively expensive and require some degree of skill to operate properly. Moreover, most such devices are designed only to be used periodically to detect density and thus leave to chance the possibility that a person will either not check the density of the liquid medium at all or will check it so infrequently that the density of the medium may be outside the safe range without being detected.

SUMMARY OF THE INVENTION

With the foregoing in mind, it is a principal object of this invention to provide a device for measuring specific gravity of liquids, particularly sea water, which is relatively simple and inexpensive to manufacture and may be used to indicate continuously the density range of the liquid.

Another object is to provide such a device and procedure by which the density of the liquid medium may be readily maintained within a safe range.

Still another object is to provide such a device which may be freely suspended within a liquid so as to be readily visible therein.

Yet another object is to provide such a device which will permit detection at a glance whether or not the specific gravity of a liquid is in the desired safe range.

These and other objects of the present invention may be achieved by providing a device including a body portion desirably in the form of a tube or rod weighted at opposite ends thereof. The density of the body portion is desirably somewhat less than the desired density or density range of the liquid medium whose density is to be measured, whereas the density of the weighted ends is greater so that the average density of the entire device falls within the desired density range of the liquid medium. Conversely, the body portion may be more dense than the liquid medium to be measured and the ends unweighted by plugs of lower density than the liquid medium to be measured.

The weighted ends of the device are also slightly unbalanced whereby when the device is placed in a liquid medium of the desired density range, the device will become suspended within the liquid medium below the surface in a vertical position with the heavier end down and the lighter end up. As the density of the liquid medium increases or decreases, the device will correspondingly rise or fall within the liquid medium. Should the density of the liquid medium become too low, the device will sink to the bottom with both ends engaging the bottom. Conversely, should the density of the medium become too high, the device will float to the top of the liquid medium with both ends of the device floating on top of the water.

Such a device makes it a simple matter to detect at a glance whether or not the density of the liquid medium is within the safe range, is too dense or not dense enough, or is tending toward the too dense or less dense zones as indicated by the position of the device within the liquid medium.

The configuration of the device is desirably such that there are no sharp angles to trap gas bubbles in the water which would affect the accuracy of the device. The device is also desirably molded out of a suitable plastic having the requisite densities, but may also be made out of other materials, including glass, also materials which are not adversely affected by the temperature of the liquid medium, or which compensate for changes in temperature.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

DESCRIPTION OF THE PREFERRED EMBODIMENT

Figure 2:
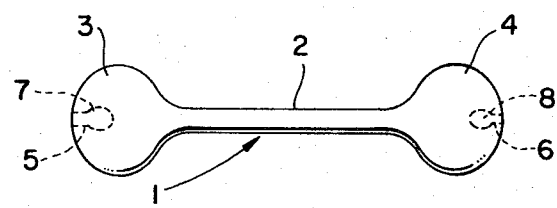
FIG. 2 is an enlarged side elevational view of the device of FIG. 1.
Figure 3:
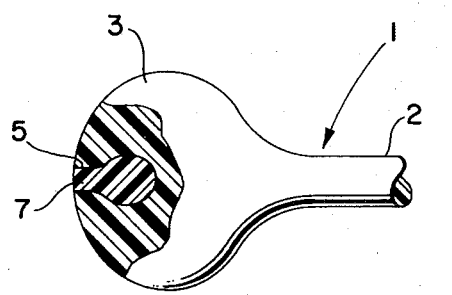
FIG. 3 is a further enlarged side elevational view of one end of the device of FIG. 2, with portions of such one end broken away to show the internal construction thereof.

Referring now in detail to the drawing and initially to FIGS. 2 and 3 thereof, there is shown by way of example a preferred form of device 1 for measuring specific gravity of liquids in accordance with this invention consisting of a body portion 2 desirably in the form of a slender tube or rod having enlarged end portions 3 and 4 at opposite ends thereof. The enlarged ends 3 and 4 of the device may be of a generally oval shape with gradual curves connecting the ends to the rod portion of the device to eliminate any sharp angles which could trap gas bubbles in the liquid medium and thereby affect the accuracy of the device.

The body portion 2 of the device may be molded as a single piece out of a suitable plastic material such as polypropylene or polyethylene of the desired density which may be varied according to the desired density range of the liquid medium with which the device is to be used. The device is primarily designed for use in measuring the density of sea water which for proper maintenance of most marine life desirably has an average density of approximately 1.022 at 75° F. and atmospheric pressure.

The density of the body portion 2 of the device should be less than that of sea water; i.e., less than 1.022 and desirably less than 1; which is true of polyethylene or polypropylene. The ends 3 and 4 of the body portion 2 are preferably weighted differently with one end slightly heavier than the other for a purpose to be subsequently described. In the preferred form of the invention shown herein, recesses 5 and 6 are molded in the ends of the body portion to permit insertion of plugs 7 and 8 therein. The plugs 7 and 8 may also be made of plastic, but which has a density much greater than the desired density of the liquid medium. As an example, the plugs 7 and 8 may be made of polyvinylchloride having a density of approximately 1.5.

To secure the plugs 7 and 8 within the recesses 5 and 6, the recesses are desirably enlarged at their inner ends and the plugs are of a corresponding shape. Insertion of the plugs 7 and 8 within the recesses 5 and 6 may readily be accomplished as by warming the plastic body portion 2 of the device 1 to cause the recesses 5 and 6 to become enlarged and cooling the plugs 7 and 8 to cause them to contract and make them more rigid so that they will easily fit into the recesses but cannot be readily removed therefrom after the body portion 2 has cooled.

The ends 3 and 4 of the device may be weighted differently simply by making one plug 7 slightly larger than the other plug 8. If the device is to be used to measure the density of sea water, which is the primary purpose for which the device was designed, the density of one end of the device should be approximately 1.023 and the density of the other end approximately 1.021, whereas the average density of the entire device should be approximately 1.022 to correspond to the desired density of sea water for use as a suitable culture medium as aforesaid.

Alternatively, the body portion 2 of the device may be more dense than the liquid medium to be measured and the ends 3 and 4 unweighted by the use of plugs 7 and 8 of lower density than the liquid medium to be measured so that the average density of the entire device still falls within the desired density range of the medium.

Although it is preferred that the device be made out of a suitable plastic material, it will be apparent that other materials having the desired densities may be used. For example, the device may be blown out of glass with bulb-shaped ends which may be weighted differently to provide the desired unbalanced condition at the ends. The device may also be made out of other materials which are not adversely affected by the temperature of the medium, or which compensate for changes in temperature.

The relative dimensions of the device may also be varied as desired, but a device in which the rod-like portion is approximately ⅛ inch in diameter and approximately 2 inches long, and the oval shaped ends are approximately ½ inch in diameter and approximately ¾ inches long has been found to be suitable for use in aquariums and the like.

In use, one or more of the devices 1 may be freely suspended within the liquid, and the position that the device assumes within the liquid will immediately indicate the density range of the liquid. If, for example, the device is properly calibrated to detect the safe range of sea water, and it sinks to the bottom as indicated at A in FIG. 1, that is an indication that the density of the water is too low, requiring the addition of the proper salts to the medium to bring the density up to the desired safe range. Conversely, if the device immediately floats to the top as indicated at B in FIG. 1, that indicates that the density of the sea water is too high, requiring the addition of fresh water to the sea water to bring the density down to the desired safe range.

If the density of the liquid is in the safe range, the device will become suspended within the liquid below the surface as shown at C in FIG. 1 in a vertical position with the heavier end 3 down and the lighter end 4 up. As the density of the liquid medium increases or decreases, the device will correspondingly rise or fall within the liquid as shown at D and E, respectively.

Figure 1:
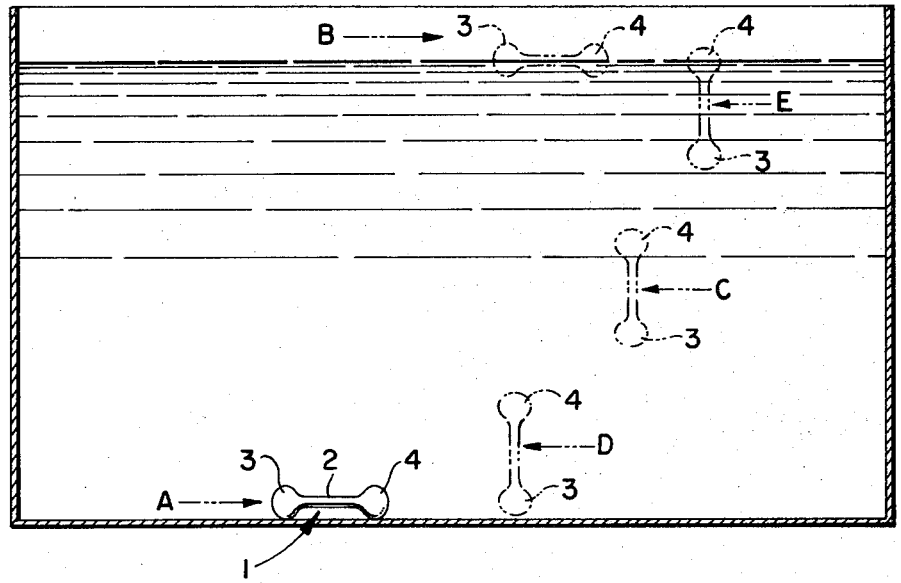
FIG. 1 is a schematic diagram illustrating the various positions that a preferred form of device for measuring specific gravity in accordance with this invention may take when freely suspended in a liquid medium for different densities of the liquid medium.

Similarly, if the device is initially placed in fresh water, it will sink to the bottom with both ends 3 and 4 laying on the bottom as shown at A in FIG. 1. However, when salt is added to the water, the water will become more dense until the lighter end 4 starts to float with the heavy end still on the bottom as shown at D. If more salt is added, the density of the water will continue to increase, causing the device to rise in the water to the position shown at C but with the heavier end still down as long as the density of the water is in the suitable culture range. As the culture medium gets denser but still in the safe range, the device will float to the top of the water with the heavy end still down as shown at E. However, when the culture medium is too dense, i.e., too much salt concentration, both ends of the device will float on top of the water as shown at B, immediately indicating that additional water should be added to the medium to reduce the salt concentration.

From the foregoing, if will now be apparent that the device of the present invention provides a very simple and reliable way of detecting whether or not the density of a liquid medium is in the desired or safe range. The density of the medium can be detected at a glance by visual observation of the location of the device within the liquid medium, and if a change in the density of the liquid medium is required, the device will also indicate whether the density has to be increased or decreased, and also when the density has been increased or decreased to the desired extent.

The embodiments of the invention in which an exclusive property or privilege is claimed are defined as folowlows:

1. Device for measuring specific gravity of a liquid comprising an elongated slender body portion having a density either more or less than the desired density of the liquid to be measured, such density being constant throughout the length of said body portion, and opposite ends having a density either greater or less than the desired density of such liquid to provide an average density for the device approximating the desired density of such liquid, said opposite ends being enlarged relative to said elongated slender body portion with gradual curves at the respective junctures thereof to eliminate any sharp edges which could trap bubbles in the liquid and thereby affect the accuracy of the device, said device being symmetrical about the axial center of said body portion, said opposite ends also being weighted differently so that they are unbalanced, whereby when the device is placed in a liquid and permitted to move freely therein, the relative position and orientation of the ends of the device will indicate the density range of the liquid.

2. The device of claim 1 wherein said body portion is of a generally rod-like shape and said opposite ends are adapted for receipt of differently weighted plugs which vary the densities of said opposite ends as aforesaid.

3. The device of claim 2 wherein said enlarged ends are of generally oval shape and said gradual curves connect said enlarged ends to the rod-like portion of said body portion.

4. The device of claim 1 wherein said body portion is made of plastic and has recesses in said opposite ends thereof, and differently weighted plugs are inserted into said recesses which vary the densities of said opposite ends as aforesaid.

5. The device of claim 4 wherein said recesses are enlarged at their inner ends, and said plugs are of a corresponding shape for securing said plugs in said recesses.

6. The device of claim 5 wherein said plugs are made of the same material which is different from the material of said body portion, and one of said plugs is larger than the other so that said opposite ends of said device are unbalanced as aforesaid.

7. The device of claim 1 wherein the density of said body portion is less than that of sea water and the density of at least one of said weighted ends is slightly greater than that of sea water to provide an average density for the device approximating the desired density of sea water.

8. The device of claim 1 wherein the density of said body portion is greater than that of sea water and the density of at least one of said weighted ends is less than that of sea water to provide an average density for the device approximating the desired density of sea water.

9. The device of claim 1 which is freely suspended in a container of sea water and free to turn and move therewithin for indicating the density range of the sea water by the relative position and orientation of the ends of the device in the container.

10. The device of claim 2 wherein said entire body portion, including said opposite ends, is an integral, one-piece construction.

* * * * *